United States Patent [19]

Ward

[11] Patent Number: 4,533,561
[45] Date of Patent: Aug. 6, 1985

[54] LOW-FAT SPREAD AND PROCESS

[75] Inventor: John Ward, Mississauga, Canada

[73] Assignee: Nabisco Brands, Inc., Parsippany, N.J.

[21] Appl. No.: 431,873

[22] Filed: Sep. 30, 1982

[51] Int. Cl.$^3$ .......................... A23D 3/00; A23D 3/02
[52] U.S. Cl. ..................................... 426/603; 426/604
[58] Field of Search ........................ 426/603, 604, 607

[56] References Cited

U.S. PATENT DOCUMENTS

| | | | |
|---|---|---|---|
| 4,045,588 | 8/1977 | Wieske | 426/603 X |
| 4,341,812 | 7/1982 | Ward | 426/603 |
| 4,341,813 | 7/1982 | Ward | 426/603 |
| 4,386,111 | 5/1983 | Van Heteren et al. | 426/603 |
| 4,404,231 | 9/1983 | Den Hollander et al. | 426/602 |

Primary Examiner—Robert Yoncoskie
Attorney, Agent, or Firm—Richard Kornutik

[57] ABSTRACT

Disclosed are a low-fat spread, preferably butter flavored, and a process for preparing it. The spread is a water-in-oil emulsion of relatively low calorie content due to a restricted fat content of from 30 to 70%, preferably 30 to 50%. The fat phase of the emulsion comprises a blend of a liquid oil with a hardstock, and the blend comprises from 10 to 30% of the fatty acids as C10, C12, C14 and C16 fatty acids and these fatty acids are predominantly in the trisaturated glyceride form. The hardstock is preferably a randomly interesterified mixture of a saturated lauric acid fat and a saturated palm fat or beef fat. The water is dispersed within the fat to a size which will permit cooling to a degree effective to achieve significant beta-prime crystal form. Preferably, the water globules will be reduced to about one micron in diameter, and the solid fat will be substantially completely in the beta-prime form.

21 Claims, 1 Drawing Figure

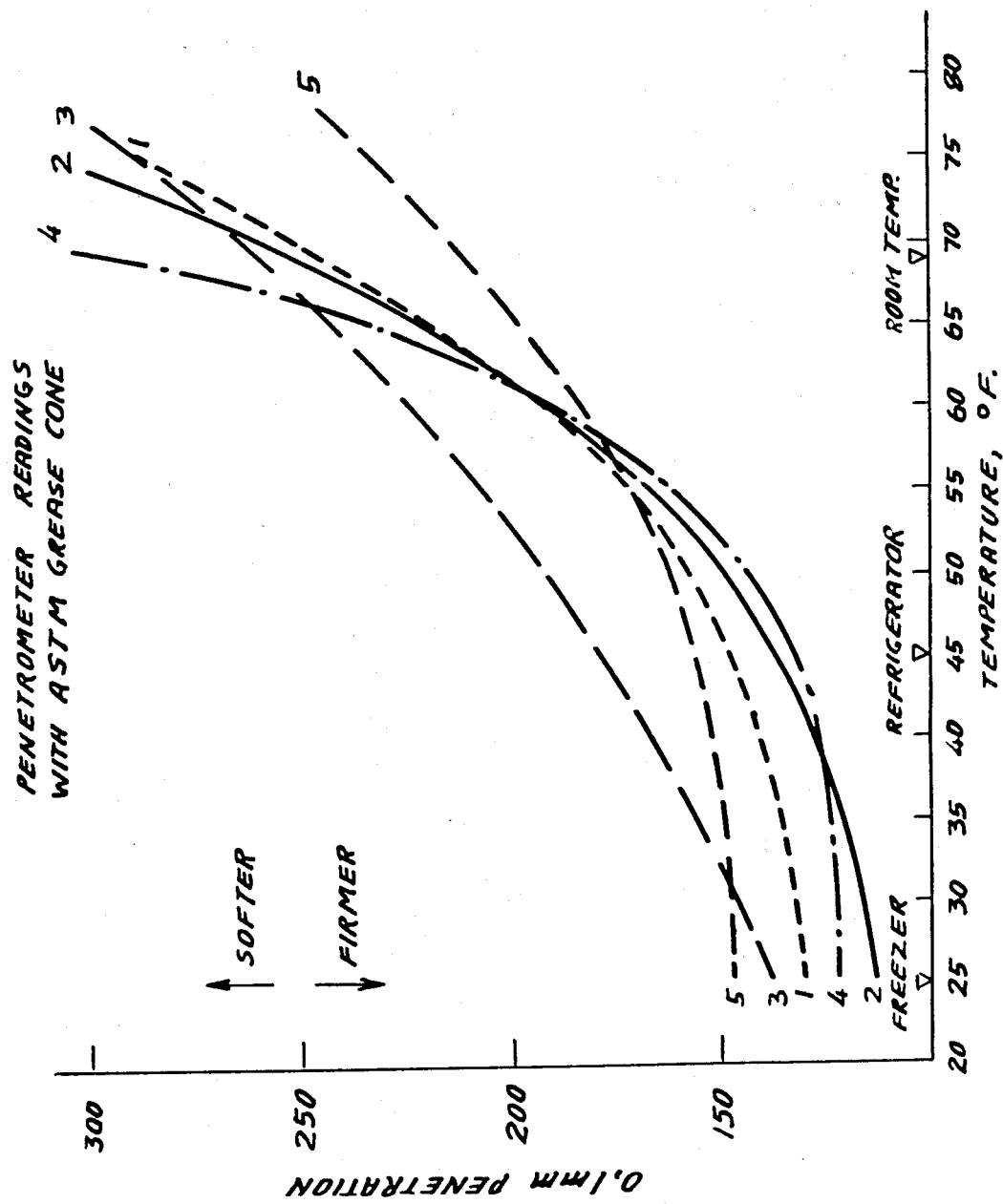

LOW-FAT SPREAD AND PROCESS

BACKGROUND OF THE INVENTION

The present invention relates to low-fat spreads; particularly, to spreads suitable as low-calorie substitutes for butter and margarine, and to a process for preparing them.

Low-fat spreads are recognized as those having from 30% to less than 80% fat content. Typically, they are water-in-oil emulsions. Low-fat spreads suitable for use as margarine substitutes are required to have certain flow or spread characteristics and should resist free oil or free water separation. And, they should otherwise simulate the characteristics of butter and margarine, including rapid melt on the tongue, good mouthfeel, fairly shiny appearance, good stability to heat such as when spread on hot foods, and freeze/thaw stability.

Among the most desirable low-fat spreads are those which offer a significant fat and calorie reduction as compared to conventional margarine or butter. Diet margarines are generally recognized as having less than half of the normal fat content, thus less than half the calories of normal margarine which contains about 80% fat. Typical diet margarine products which contain 60% or more of an aqueous phase have been the source of considerable technical difficulty and investigation.

The art is replete with prior art attempts to provide low-fat butter or margarine substitutes. Among these is U.S. Pat. No. 3,457,086 to Josefowicz et al, which teaches the production of a protein-free spread which contains as low as 35% fat. The patent states that the observance of specified conditions is necessary to maintain the emulsion in the water-in-oil form. Unfortunately, products of this type tend to have a watery flavor because of their high water content and the absence of milk proteins which help impart the desirable butter-like taste of margarine or butter, but which cannot be tolerated in the product because of their emulsion destabilizing effect. Moreover, the high water content tends to make emulsions of this type rapidly break down on hot foods, tending to make foods like toast become soggy and unappetizing. Moreover, while some consumers have found it convenient to buy large quantities of margarine or butter at sale prices and then freeze them, low-fat spreads prepared by that and similar processes cannot tolerate freezing. Upon thawing, the emulsion breaks down with consequential release of its water phase.

Typically, low-fat spreads of the type disclosed by Josefowicz et al, cited above and Spitzer et al in U.S. Pat. No. 3,360,377, result in very tender emulsions when desirably low fat contents, on the order of about 40%, are employed. For example, Spitzer et al, which discloses examples A-J of different suitable margarine oils, D and E being randomized coconut oil and coconut oil blends, emphasize the need for rapid cooling after homogenization to maintain emulsion stability, especially when lower-fat contents are employed. Spitzer et al disclose that 20% to about 55% oleaginous ingredients can be formed into an emulsion suitable for a margarine substitute when certain procedural constraints are observed. For example, in forming the emulsion, it is necessary to first form a coarse emulsion at a temperature within the range of around 80° to 140° F. and then cool prior to forming a fine emulsion in a colloid mill at a temperature within the range of around 73° to 113° F. The temperature at which the chilled emulsion assumes an appropriate consistency is disclosed as generally within the range of from around 50° to 72° F., for example 59° F. These emulsions will not tolerate cooling in conventional scraped surface chilling processors at temperatures below 50° F. Processing at temperatures of around 50° F. or below results in breakdown of the emulsion. And, at temperatures in the 50° to 60° F. range, the emulsion becomes extremely stiff and heavy. The emulsions become so stiff and heavy that they often present problems of flow into the packaging container or physically exude free moisture from the mass. Further, like the products produced by Josefowicz et al, the emulsions of Spitzer et al cannot tolerate the presence of milk protein as conventionally employed in margarines and require elevated levels of emulsifiers, especially at low fat contents.

Further exemplary of prior art low-fat margarine processing is U.S. Pat. No. 3,889,005 to Brammer et al. According to that disclosure, an emulsifier system consisting essentially of saturated fatty acid partial glycerides and unsaturated fatty acid partial glycerides is said to improve emulsion stability. However, evidence that low temperature working in a scraped-surface chilling process cannot be achieved is the statement in the examples that the product is worked and packed at 20° C. (68° F.). At these temperatures, the crystal form of the solid fat will be predominantly in the beta form which results in large crystals, on the order of 25 to 50 microns. Apparently, these large crystals of fat and the high content of water in globules of 3-5 microns, together create a stiffness at low temperatures in the chilled processor which ruptures the fat boundaries separating the water globules and causes emulsion breakdown. This is typical of known low-fat margarines based on water-in-oil emulsions.

A further deficiency of many diet margarine products is that they cannot retain emulsion stability when subjected to freezing temperatures and then thawed. Typically, exposure to freezing temperatures and subsequent thawing results in coalescence of water droplets due to the expansion of the dispersed water during ice crystal formation and subsequent contraction upon thawing. The problem is especially acute in diet margarines because the water usually predominates over the fat in concentration, leaving the fat highly stretched out and incapable of maintaining the water in dispersed form as it stretches and then contracts during the freeze/thaw cycle. Some diet margarines have overcome this deficiency in freeze/thaw performance by the addition of gelatins and gums to the dispersed water phase. Such diet margarines still, however, require scraped-surface cooling at temperatures higher than 50° F., have poor stability at elevated temperatures, and have an undesirable mouthfeel.

In an effort to overcome the problems caused by the presence of protein and low fat content in low-fat spreads, Bodor et al disclose in U.S. Pat. No. 4,103,037 the use of a gelling agent, such as gelatin, having a melting point sufficiently high to withstand room temperature yet low enough to allow it to melt in the mouth. This gelling agent ties up all available water into minute, solid particles which are dispersed throughout a continuous fat phase. These multiple particles contain the water soluble flavors and salt, and diminish the flavor impact of these components.

In further evidence of the poor stability of the currently available low-fat spreads based upon water-in-oil emulsions, are several more recent patents which employ oil-in-water emulsions. Among these are U.S. Pat. No. 4,238,520 to Miller et al, which discloses an oil-in-water emulsion having stably dispersed therein about 20% to 40% fat and preferably employs from about 2% to 5% of a lipoidal emulsifier and 0.5% to 3.25% of a thickening agent. In another approach, Bosco et al, U.S. Pat. No. 4,279,941 disclose a spread based upon an oil-in-water emulsion containing from 5% to 40% fat and employing hydrophilic emulsifiers in combination with stabilizing agents and fats having specified SFI profiles. While products of the types described in these patents do have advantages in terms of emulsion stability and the ability to employ protein, they are a departure from more typical margarine technology based upon water-in-oil emulsions, and thus require significantly different processing.

There remains a need for a water-in-oil based low-fat spread which has improved stability and provides an effective substitute for conventional margarine and butter under a broader range of conditions of storage and use.

SUMMARY OF THE INVENTION

It is an object of the present invention to provide an improved low-fat spread and a process for preparing it.

It is a more specific object of the present invention to provide an improved low-fat, preferably butter-flavored, spread and a process for preparing it, wherein the product is based upon a water-in-oil emulsion which provides an effective substitute for butter and conventional margarine under a broad range of conditions of storage and use.

It is another specific object of the invention to provide an improved low-fat, preferably butter-flavored, spread and a process for preparing it wherein the product is based upon a water-in-oil emulsion and can include dairy proteins to enhance the flavor and nutrition of the product without adversely affecting emulsion stability.

It is a further more specific object of the present invention to provide a low-fat, preferably butter-flavored, spread and a process for preparing it, wherein the spread has a consistency in rheological properties which enables it to remain suitably firm at room temperature, but yet not unduly hard at refrigerator temperatures.

It is yet a further specific object of the invention to provide a low-fat, preferably butter-flavored, spread based upon a water-in-oil emulsion and a process for preparing it, wherein the product remains solid and easily spreadable at all temperatures within the range of from 32° F. to about 80° F., yet melts down quickly in the mouth to release flavor without imparting a "waxy" mouthfeel and remains as a stable emulsion at temperatures typically encountered for hot food dishes.

It is yet a further specific object of the invention to provide a low-fat, preferably butter-flavored, spread based upon a water-in-oil emulsion and a process for preparing it, wherein the emulsion remains stable during freeze/thaw cycling.

It is another object of the present invention to provide a low-calorie, preferably butter-flavored, spread based upon a water-in-oil emulsion and a process for preparing it, wherein the spread is low in trans isomer content.

It is another object of the present invention to provide a low-calorie, preferably butter-flavored, spread based upon a water-in-oil emulsion and a process for preparing it, wherein the spread has a high ratio of polyunsaturated to saturated fatty acids, preferably greater than 1.5 for stick-type products and greater than 2.0 for soft or tub-type products.

It is another object of the present invention to provide a low-fat, preferably butter-flavored, spread based upon a water-in-oil emulsion and a process for preparing it, wherein the spread has a desirable surface sheen.

It is another object of the present invention to provide a process for preparing a low-fat spread based upon a water in oil spread which enables low-temperature working after emulsification to achieve a desirable polymorphic crystalline behavior which results in improved rheological properties.

It is another specific object of the present invention to provide a low-fat, preferably butter-flavored, spread and a process for preparing it, wherein the spread is based upon a water-in-oil emulsion and provides a close simulation to the desirable attributes and characteristics of butter and margarine while presenting a caloric content significantly reduced therefrom.

These and other objects are achieved according to at least the preferred embodiments of the present invention which provides an improved low-fat spread and a process for preparing it. The spread, in its broad aspects, comprises: from about 30 to about 70% of a highly-dispersed aqueous phase; and from about 30% to about 70% of a continuous fat phase comprising a blend of from about 70% to about 95% by weight of a liquid vegetable oil and from about 5% to about 30% of a hardstock, the blend comprising from 10 to 30% of the fatty acids as C10, C12, C14 and C16 fatty acids and these fatty acids are predominantly in the trisaturated glyceride form, the solid fat being present predominantly in the beta-prime crystal form. The hardstock preferably has an SFI solids content of at least 30% at 92° F., being a randomly interesterified mixture of a saturated lauric acid fat and a second saturated edible oil, the mixture comprising said lauric acid fat and said second oil in the weight proportions of from about 90:10 to about 40:60. Preferably, the aqueous phase will be finely dispersed into globules of about one micron or less in diameter and the solid fat will be substantially completely in the beta-prime form.

The process according to the invention in its broad aspects comprises forming a liquid emulsion according to the above formulation, finely dispersing the aqueous phase within the fat phase to achieve a water-in-oil emulsion sufficiently stable to permit cooling under conditions effective to crystallize the hardstock in predominantly the beta-prime crystal form without breaking the emulsion; and cooling the emulsion under conditions effective to crystallize the solids content in predominantly the beta-prime crystal form. Preferably, the aqueous phase is uniformly dispersed to a water globule size of approximately one micron in diameter. This enables cooling the emulsion in conventional scraped-surface heat exchangers at temperatures of from 30° F. to about 55° F. to achieve predominantly beta-prime crystalline fat formation. Most preferably, the exit temperature will be below 50° F. Preferably, the dispersion of the aqueous phase and the subsequent cooling and crystallization are conducted under conditions effective to produce substantially all crystals in the beta-prime form.

BRIEF DESCRIPTION OF THE DRAWING

The invention will be better understood and its advantages will be more apparent when the following detailed description is read in light of the accompanying drawing wherein:

The FIGURE is a graph showing the results of a comparison of the penetration readings for a product produced according to Example 1 to four current commercial diet margarines.

DETAILED DESCRIPTION OF THE INVENTION

According to the invention, it is now possible to formulate a diet margarine comprising vegetable oils, having surprisingly good rheological properties which include freeze/thaw stability, negligible oils off at 80° F., a brighter gloss due to the extra light which is reflected from the finer crystals of the beta-prime state, and a surprisingly good consistency of penetration values within the range of from 25° to 75° F.

While not wishing to be bound to any particular theory, evidence indicates that these properties may be attributed to the use of a defined type of hardstock with liquid vegetable oils and the fine dispersion of the aqueous phase which enable the achievement of a unique polymorphic behavior in the fat phase. The properties of the emulsion enable cooling at temperatures as low as 30° F. to permit the solidifying portion of the fat to crystallize in the beta-prime form. It is believed that these crystals, typically needle-shaped crystals of not more than one micron in length and much smaller than the beta crystals obtained at temperatures above 50° F., more typical of low-fat spread processing, are permitted to slide past one another and past the finely dispersed water globules during cooling. Thus, it is believed that by maintaining particles of the fat in the beta-prime form and the size of the water globules in a similarly small size, the particles of fat and water can move freely within a continuous liquid oil phase. The discontinuous solid fat and water portions remain of such a small size during cooling and working that a consistency in rheological properties is achieved which essentially eliminates any tendency to break the emulsion as happens during the low-temperature processing of conventional low-fat emulsions in scraped surface cooling equipment such as Votator heat exchangers of the "A" type.

The particular composition of the continuous oil phase is also believed to contribute an unusually strong interfacial film which allows high shearing of the dispersed water phase in the emulsion preparation. This results in extremely fine and uniform water globule size which, due to the strong interfacial film of the continuous oil phase, does not allow coalescence of the water droplets.

The present invention is directed to the production of low-calorie, low-fat spreads from 70% to 30% fat content, for both tub and stick margarine, having superior rheological properties such that they have penetration values within the accepted ranges for normal (80% fat) margarine product, while remaining spreadable though frozen and possessing considerable body with minimal oil off at 80° F. All percentages in this description are based on the weight of the subject component and weight of the total composition or a specifically-identified portion thereof, unless otherwise indicated.

Margarines are normally sold in two principal types, namely print, hard or stick, margarine and soft or tub margarine. Hard or stick margarine would have a firmness consistent with a penetration range of 65 to 123 being in units of 0.1 mm using an ASTM grease cone at 45° C. according to the official method of the American Oil Chemists' Society (AOCS), designated Cc 16-60. Soft or tub margarine, on the other hand, would have a firmness consistent with a penetration range of 130 to 210.

The term "fat" as used herein is intended to include all edible, fatty acid triglycerides regardless of origin or whether they are solid or liquid at room temperature. Thus, the term "fat" includes normally liquid and normally solid vegetable and animal fats and oils. Where the term "oil" is employed herein, it is intended to refer to those fats which are normally liquid in their unmodified state.

It is preferred that sufficient liquid oil of sufficiently high polyunsaturate content be employed to provide a ratio of polyunsaturated fatty acids to saturated fatty acids in the product of at least 1.5 in the case of stick-type products and at least 2.0 in the case of soft or tub-type products. The polyunsaturated fatty acids are defined as cis, cis-methylene-interrupted polyunsaturated fatty acids determined according to the Canadian Food and Drug Directorate Method FA-59 and confirmed by gas-liquid chromotography. Accordingly, the fat phase will comprise a blend of liquid oil and hardstock, with the liquid oil comprising from 70 to 95% of the phase, preferably from 75 to 90%. In the case of soft spreads, the liquid oil content will be at least 80%, permitting the higher ratio of polyunsaturates to saturates.

A wide variety of edible liquid vegetable oils may be used in formulating the edible fat portion of the low-calorie, low-fat spread. These include safflower oil, sunflower oil, soybean oil, rapeseed or canola oil, peanut oil, cottonseed oil, corn oil, linseed oil, and wheat germ oil.

The hardstock is preferably a randomly interesterified mixture of a saturated lauric acid fat and a saturated second oil in proportions by weight of about 90:10 to about 40:60, preferably from about 80:20 to about 50:50. Suitable saturated fats may be obtained by hydrogenating, either in admixture or separately, or by fractionating a suitable fat. Suitable lauric acid fats are those selected from the group consisting of palm kernel oline, palm kernel oil, babassu nut oil, coconut oil, fractions of other lauric acid oils having fatty acid components similar to these, and mixtures thereof. Of these, babassu nut oil is preferred as described in my previous copending Canadian Patent Application Nos. 354,417 and 354,377, filed on June 19, 1980. The fat products disclosed in these applications are substantially free of trans isomers and are high in polyunsaturates, being highly desirable for use in diet margarines. While it is impractical commercially to prepare a product having absolutely no determinable trans isomer content, the products of the invention preferably substantially eliminates trans isomer content. Preferred products are made under suitable controls to assure a trans isomer content of less than 1%. It is important in this regard that hydrogenation of the lauric acid oil and the second oil be carried out to an iodine value of less than 2. The term "low trans isomer content" is defined as meaning less than 1% trans isomer content. The trans isomer content is determined by infra-red spectrophotometry according to the official method of the American Oil Chemists' Society designated Cd-14-61.

Typical of the second oil in the interesterified mixture are single oils or blends or fractions of oils including palm oil, and animal fats such as tallow. The desired low trans content cannot be achieved when the second oil comprises unsaturated oil such as rapeseed oil, cottonseed oil or soybean oil; however, they may be employed with this limitation.

The random interesterification of the hardstock component from suitable saturated fats obtained by hydrogenation, in admixture or separately, or by fractionating a suitable fat, is effected at an elevated temperature and under vacuum in the presence of a suitable catalyst. Preferably, after interesterification the product will have a solids content of not less than 30% at 92° F. (as determined by the AOCS SFI method) and preferably a Wiley Melt Point of about 108° F. to 120° F. Completion of the interesterification reaction of the lauric/palmitic mixture is usually determined by a 10° F. lowering of the melt point of the product as compared to the mixture prior to interesterification.

It is possible to form the hardstock by first interesterifying the specified oils and then hydrogenating. Such a procedure is less preferred since completion of the interesterification is less susceptible to precise determination than in the case where the interesterification is effected after saturation of the materials.

The combined fat phase will preferably comprise a predominant proportion of C10, C12, C14, C16, and C18 fatty acids such that its crystalline-tending behavior is oriented toward the beta-prime state. The preferred distribution of fatty acid chain lengths will be as follows:

| | |
|---|---|
| C10 | .5–3% |
| C12 | 2–11% |
| C14 | .5–3% |
| C16 | 7–13% |
| C18 | 70–90% | with the proportion of C10, C12, C14, C16 fatty acids being predominantly in the trisaturated glyceride form. This permits achievement of the beta-prime crystalline form while maintaining solids contents which provide a desirable product texture and yet permit cooling under beta-prime tending temperatures without breaking the emulsion.

The fat phase will preferably have a relatively constant level of solids at the desired temperatures of use. In addition to the above criteria, it is therefore preferred that the product exhibit a solid fat index (SFI) with certain ranges. The SFI relates to the proportion of solid triglycerides in the oil as measured under specified conditions. It is calculated from dilatometer measurements as described in AOCS tentative method Cd 10-57. The best stick and soft products of the invention will be made from fat blends having the following SFI values:

| | Solids (%) | |
|---|---|---|
| Temperature | Stick | Soft |
| 50° F. | 13–15 | 8–10 |
| 70° F. | 8–10 | 6–8 |
| 80° F. | 5–7 | 4–6 |
| 92° F. | 2–3 | 1.5–2.5 |

Less preferred products would have SFI values which vary by as much as about 2% on either side of the various values given above.

The fat blend employed according to this invention may be initially emulsified in conventional manner. However, the emulsion can tolerate higher levels of protein and achieves greater stability at low emulsifier levels than typical known low-fat spreads. These advantages are believed to be achieved in part by the use of the fat phase described above, and in part by the physical state of the emulsion achieved due to the improved process.

The aqueous phase is formed in conventional fashion by blending water with such typical ingredients as salt, proteinaceous materials such as skim milk powder, whey protein, casein, sodium caseinate or soy protein; preservatives such as potassium sorbate, benzoic acid, calcium disodium EDTA; hydrophilic colloids such as alginates, xantham, carob bean, or other vegetable gums; and flavorants such as citric acid, lactic acid, and artificial or natural flavors.

The emulsion will contain sufficient levels of suitable emulsifiers such as mixed fatty acid monoglycerides; mixed fatty acid diglycerides; mixtures of fatty acid mono- and diglycerides; lipophilic polyglycerol esters; lecithin glycerol esters, such as glyceryl monooleate, glyceryl dioleate, glyceryl monostearate, glyceryl distearate, glyceryl monopalmitate, and glyceryl dipalmitate; lactylated esters such as glyceryl-lacto esters of fatty acids; propylene glycol esters, such as propylene glycol monopalmitate, propylene glycol monostearate, and propylene glycol monooleate; sorbitan esters, such as sorbitan monostearate, sorbitan trioleate, sorbitan tripalmitate, sorbitan tristearate, and sorbitan sesquioleate; fatty acids or their soaps such as stearic acid, palmitic acid, and oleic acid; and mixtures thereof. There is no known criticality in the use of any particular emulsifier. Thus, it is fully intended that other equivalent materials can be employed with satisfactory results. The emulsifiers will be employed separately or in combination at levels effective to achieve and maintain a stable emulsion. Typical levels will be in the range of from about 0.25 to about 1.5%. (Standard composition of calorie-reduced margarines in Canada specifies a maximum in combination of 0.5%.)

The fat and aqueous phases are mixed at a temperature of from 100° to 140° F. to form an emulsion. The admixture is then subjected to high shear to form a tight emulsion with the water globules finely dispersed within a continuous fat phase. The globules of water are reduced to a size effective to maintain the emulsion in stable form, without breaking, when processed under conditions effective to crystallize the solid fat portion of the fat phase in predominantly the beta-prime crystalline form. Preferably, the water globules will permit substantially complete crystallization of solid fat in the beta-prime form. Most preferably, the water globules will be reduced to a size of one micron or less in diameter.

Dispersion of the water into the fine globules can be achieved in any manner suitable. The preferred apparatus, however is of the type described in U.S. Pat. No. 4,142,806 and Canadian Pat. No. 1,038,370 wherein the loose emulsion is fed tangentially into a chamber wherein it is caused to flow in a spiral motion, from the inside wall toward the center, constantly creating shear within the emulsion at all points within the chamber. Preferably a unit of this type, referred to by its manufacturer Gaulin Corporation as a Gaulin Hydroshear system, is used to recirculate emulsion maintained within a holding tank. In this configuration, the contents of the tank will preferably be recirculated about every 15 minutes. If desired, suitable colloid mills can also be employed to achieve the tight emulsion. Typically, however, dairy homogenizers of the type employing a plurality of stages at high pressures to achieve mechanical shear by enforcing the admixture of fat and aqueous phases though a narrow orifice, tend to provide inconsistent results. The high pressures required by this equipment to achieve the requisite small globule size for the low temperature emulsion stability necessary to achieve beta-prime crystal formation, tend to invert the emulsion. However, their use is not ruled out where they can be properly regulated to achieve the desired results.

After emulsification, the emulsion is cooled under conditions effective to crystallize the solid fat portion of the emulsion predominantly, and preferably substantially completely, in the beta-prime crystalline form. This can be accomplished by the use of scraped-surface heat exchangers, such as Votator "A" units, sometimes referred to as scraped-surface chilling tubes, operated at suitably low temperatures. Typically, a series of two or three Votator "A" units will be employed to reduce the temperature of the emulsion to within the range of from about 30° to about 55° F. Preferably, the emulsion is worked up to form a stable, fluid emulsion which emerges from the chilling apparatus at a temperature of less than 50° F. The product is then caused to flow into tub-shaped packages or to resting tubes prior to packaging into stick or pat form.

The present invention will be illustrated further by the following examples and by reference to FIG. 1 which is a graph showing the penetration values plotted as a curve of penetration against temperature. Unless otherwise indicated, all parts are by weight.

EXAMPLE 1

This example illustrates the formation of a soft, low-calorie spread with a fat content of 40% and suitable for tub fill according to the invention.

Palm kernel oline and palm oil in a 70:30 proportion were hydrogenated at 300° F. using a suspension of 0.2% nickel catalyst (26% Ni), to an iodine value of less than 2.0 to form a saturated product of melt point 122° F. The hydrogenated material was filtered to remove the nickel and steam stripped under vacuum to decrease the free fatty acid content below about 0.03 wt%. Under a high vacuum of 2-3 mm Hg, the mixture was heated to 250° F., and 0.05% sodium methoxide catalyst added with intense agitation for 15 minutes. A sample of product was analyzed to confirm that interesterification was complete, as determined by a 10° F. lowering of the melt point as compared to the mixture prior to interesterification. The temperature of the reaction mixture was decreased to 180° F. and 0.4 wt% of a 30% aqueous solution of magnesium sulphate in hot water was added to destroy residual catalyst. The temperature was then raised to 210° F. and 1% bleaching earth was added to bleach the product. Thereafter the interesterified material was cooled and filtered.

The hardstock product was found to have an SFI solids value of 36% at 92° F. and a Wiley Melt Point of 112° F.

The hardstock described was mixed in a proportion 16:84 with liquid sunflower oil to form the fat portion of the following formula:

| OIL PHASE | |
|---|---|
| Oil blend | 39.00 |
| Lecithin | 0.20 |
| Monoglycerides | 0.50 |
| Vitamins & Color | 0.009 |
| AQUEOUS PHASE | |
| Water | 57.62 |
| Salt | 2.00 |
| Whey Powder | 0.50 |
| Potassium Sorbate | 0.07 |
| Citric Acid | 0.001 |
| Alginate | 0.10 |

The fat phase was added first to an emulsion feed tank heated to 125° F. and circulated through a Gaulin Hydroshear unit. The water phase was heated to 125° F. and added to the emulsion feed tank with circulation continuing through the Gaulin Hydroshear unit. The material in the tank was fully circulated through the Hydroshear unit about every 15 minutes. The emulsion was supercooled through two Votator scraped-surface chill tubes, then through a worker tube, and finally through a third scraped-surface chill tube emerging at 46±2° F. to be filled into tubs. The resulting soft diet margarine spread readily, did not exhibit oil or water separation during processing or subsequently at room temperature and had good mouth break. In addition, the product had excellent freeze/thaw stability when cycled for 48 hour periods at 25° F. and 80° F.

Superior rheological properties of the resulting low-calorie spread are evidenced by the following penetration data comparing the product of this example to four commercially-available low-calorie spreads. Penetrations were conducted with an ASTM grease cone measuring units of 0.1 mm at temperatures of 25° F. representing freezer temperatures, 45° F. representing refrigeration temperatures, and 75° F. representative of room temperatures. The data is as follows:

TABLE I

| | 25° F. | 45° F. | 75° F. |
|---|---|---|---|
| 1 D. W. | 130 | 147 | 285 |
| 2 M. D. | 113 | 138 | 300 |
| 3 I. D. | 138 | 180 | 285 |
| 4 P. D. | 135 | 135 | 380 |
| 5 Patent Example 1 | 155 | 155 | 235 |

Such a range of penetration values shows a product consistency softer than similar products in the market place at the low temperatures yet firmer than similar products at warmer temperatures. This phenomenon can be readily seen when the penetration values are plotted as a curve of penetration against temperature and compared against such curves for similar products as seen in the accompanying drawing.

The presence of the solid fat in the beta-prime crystal state has been shown by X-ray diffraction photography. The diffraction pattern produced shows defraction lines of 4.20 and 3.80 angstrom units which supports the conclusion that the fat crystals were exclusively in the beta-prime crystal form.

EXAMPLE 2

This example illustrates the formation of a hard, low-calorie spread with a fat content of 40% and suitable for stick or pat form according to the invention.

Palm kernel oline and palm oil in 75:25 proportion were hydrogenated at 300° F. using a suspension of 0.2% nickel catalyst (26% Ni) to an iodine value of less than 2.0 to form saturated product of melt point 119° F.

The hydrogenated material was filtered to remove the nickel and steam stripped under vacuum to decrease the fatty acid content below about 0.03 wt%. Under a high vacuum of 2-3 mm Hg, the mixture was heated to 250° F. and a 0.05% sodium methoxide catalyst added with intense agitation for 15 minutes. A sample of product was analyzed to confirm that interesterification was complete as determined by a 10° F. lowering of the melt point as compared to the mixture prior to interesterification. The temperature of the reaction mixture was decreased to 180° F. and 0.4 wt.% of a 30% aqueous solution of magnesium sulphate in hot water was added to destroy residual catalyst. The temperature was then raised to 210° F. and 1% bleaching earth was added to bleach the product. Thereafter the interesterified material was cooled and filtered. The hardstock product was found to have an SFI solids value of 34% at 92° F. and a Wiley Melt Point of 109° F.

The hardstock described was mixed in a proportion 25:75 with liquid sunflower oil to form the fat portion of the following formula:

| FAT PHASE | |
|---|---|
| Oil Blend | 39.00 |
| Lecithin | 0.20 |
| Monoglycerides | 0.50 |
| Vitamins & Color | 0.009 |
| AQUEOUS PHASE | |
| Water | 57.62 |
| Salt | 2.00 |
| Whey Powder | 0.50 |
| Potassium Sorbate | 0.07 |
| Citric Acid | 0.001 |
| Alginate | 0.10 |

The fat phase was added first to the emulsion feed tank, heated to 125° F. and circulated through a Gaulin Hydroshear unit. The water phase was heated to 125° F. and added to the emulsion feed tank with circulation continuing through the Gaulin Hydroshear unit. The emulsion was supercooled through three Votator scraped-surface chill tubes then to cycled resting tubes emerging at 46±2° F. in state suitable for forming into pats or sticks. The resulting stick diet margarine spread readily, did not exhibit oil or water separation during processing or subsequently at room temperature and had a good mouth break.

The stick diet margarine had a penetration value of 120 being in units of 0.1 mm using an ASTM grease cone at 45° F.

In addition, the product had excellent freeze/thaw stability when cycled for 48 hour periods at 5° F. and 80° F.

The above description is presented for the purpose of enabling the person skilled in the art to make and use the invention. The description is not intended to explain each and every obvious modification and variation of the invention which will become apparent to the skilled worker upon reading. It is intended, however, to include all such modifications and variations within the scope of the invention which is defined by the following claims.

I claim:

1. A low-fat spread comprising: from about 50% to about 70% of a highly-dispersed aqueous phase; and from about 30% to about 50% of a continuous fat phase comprising a blend of from about 70% to about 95% by weight of a liquid vegetable oil and from about 5% to about 30% of a hardstock, the blend comprising from 10 to 30% of the fatty acids as C10, C12, C14 and C16 fatty acids, these fatty acids being predominantly in the trisaturated glyceride form, and the solid fat is present predominantly in the beta-prime crystal form.

2. A low-fat spread according to claim 1 wherein the hardstock has an SFI solids content of at least 30% at 92° F., and said hardstock comprises a randomly interesterified mixture of a saturated lauric acid fat and a second saturated edible oil, wherein the lauric acid fat and the second oil are present in the weight proportions of from about 90:10 to about 40:60.

3. A low-fat spread according to claim 2 wherein the lauric acid fat comprises a member selected from the group consisting of coconut oil, babassu nut oil, palm kernel oil, palm kernel oline, a fractionated lauric oil having fatty acid components equivalent to coconut oil, babassu nut oil, palm kernel oil or palm kernel oline, and combinations thereof.

4. A low-fat spread according to claim 2 wherein said second oil comprises palm oil or tallow.

5. A freeze/thaw stable low-fat spread according to either of claims 1 or 2 wherein the aqueous phase is dispersed into globules of about 1 micron in diameter.

6. A freeze/thaw stable low-fat spread according to either of claims 1 or 2 wherein the solidified fat is substantially completely in the beta-prime form.

7. A low-fat spread according to claim 1 wherein the distribution of fatty acids in the fat phase is substantially as follows:

| | |
|---|---|
| C10 | 0.5-3% |
| C12 | 2-11% |
| C14 | 0.5-3% |
| C16 | 7-13% |
| C18 | 70-90%. |

8. A low-fat spread according to any of claims 1, 2 or 7 wherein the aqueous phase is dispersed into globules of about 1 micron in diameter and the solidified fat is substantially completely in the beta-prime form.

9. A freeze/thaw stable low-fat spread having a ratio of polyunsaturated fatty acids to saturated fatty acids of greater than 1.5, which comprises: from about 50 to about 70% of a highly dispersed aqueous phase having globules of about one micron in diameter; and from about 30% to about 50% of a continuous fat phase comprising a blend of from about 70% to about 95% by weight of a liquid vegetable oil and from about 5% to about 30% of a hardstock comprising a blend of a liquid oil with a hardstock, the blend comprising from 10 to 30% of the fatty acids as C10, C12, C14 and C16 fatty acids, these fatty acids being predominantly in the trisaturated glyceride form, and the solid fat is present predominantly in the beta-prime crystal form.

10. A low-fat spread according to claim 9 which has a ratio of polyunsaturated to saturated fatty acids of greater than 2.

11. A low-fat spread according to claim 9 which has a trans isomer content of less than 1%.

12. A low-fat spread according to claim 9 wherein the hardstock has an SFI solids content of at least 30% at 92° F., and comprises a randomly interesterified mixture of a saturated lauric acid fat and a second saturated edible oil, the mixture comprising said lauric acid fat and said second oil in the weight proportions of from about 80:20 to about 40:60.

13. A low-fat spread according to claim 12 wherein the distribution of fatty acids in the fat phase is substantially as follows:

| | |
|---|---|
| C10 | 0.5–3% |
| C12 | 2–11% |
| C14 | 0.5–3% |
| C16 | 7–13% |
| C18 | 70–90%. |

14. A process for preparing a low-fat spread comprising: finely dispersing from about 30% to about 70% of an aqueous liquid within from about 30% to about 70% of a continuous fat phase comprising from about 70% to about 95% by weight of a liquid vegetable oil and from about 5% to about 30% of a hardstock, the combined oil and hardstock comprising from 10 to 30% of the fatty acids as C10, C12, C14 and C16 fatty acids, and these fatty acids being predominantly in the trisaturated glyceride form; finely dispersing the aqueous phase within the oil phase sufficiently to achieve a water-in-oil emulsion sufficiently stable to permit cooling under conditions effective to crystallize the hardstock in predominantly the beta-prime form without breaking the emulsion; and cooling the emulsion in a scraped-surface heat exchanger to a final exit temperature in the range of from about 30° F. to about 55° F. to crystallize the solid fat portion in predominantly the beta-prime crystal form.

15. A process according to claim 14 wherein the aqueous phase is uniformly dispersed to a water globule size of approximately 1 micron in diameter.

16. A process according to claim 14 wherein the hardstock has the SFI solids content of at least 30% at 92° F., and comprises a randomly interesterified mixture of a saturated lauric acid fat and a second saturated edible oil, the mixture comprising said lauric acid fat and said second oil in the weight proportions of from about 90:10 to about 40:60.

17. A process according to claim 14 wherein the fat phase comprises from about 30% to about 50% and the aqueous phase comprises from about 50% to about 70%, both percentages based on the weight of the emulsion.

18. A process according to claim 14 wherein the fatty acid distribution within the oil phase is as follows:

| | |
|---|---|
| C10 | 0.5–3% |
| C12 | 2–11% |
| C14 | 0.5–3% |
| C16 | 7–13% |
| C18 | 70–90%. |

19. A process according to claim 18 wherein the aqueous phase is uniformly dispersed to a water globule size of approximately 1 micron in diameter.

20. A process according to claim 19 wherein the water-in-oil emulsion is prepared by passing an admixture of the aqueous and fat phases tangently into a chamber under conditions effective to cause them to move spirally toward a centrally-located exit path from the chamber while creating shear within the admixture sufficient to finely disperse the aqueous phase within the fat phase.

21. A process according to claim 20 wherein the water-in-oil emulsion comprises from about 30% to about 50% of the fat phase and from about 50% to about 70% of the aqueous phase.

* * * * *